United States Patent [19]

Farmer et al.

[11] Patent Number: 4,611,093

[45] Date of Patent: Sep. 9, 1986

[54] ELECTRICAL BUSHING HAVING A REPLACEABLE STUD

[75] Inventors: Donald J. Farmer, Pine Bluff, Ark.; Joseph F. Powell, III, Halifax, Va.

[73] Assignee: Colt Industries Operating Corp, New York, N.Y.

[21] Appl. No.: 572,378

[22] Filed: Jan. 20, 1984

[51] Int. Cl.[4] ...................... H01B 17/26; F16B 31/00; F16B 35/00

[52] U.S. Cl. .......................... 174/152 R; 339/126 R; 411/5; 411/389

[58] Field of Search .................... 174/18, 75 R, 75 D, 174/145, 152 R, 152 S, 153 R; 313/136; 339/100, 126 R, 195 R, 206 P, 214 R, 214 C; 411/389, 2, 3, 5; 403/2

[56] References Cited

U.S. PATENT DOCUMENTS

| | | | |
|---|---|---|---|
| 71,909 | 12/1867 | Pierce | 411/389 |
| 1,842,833 | 1/1932 | Leonard | 174/152 S |
| 1,908,007 | 5/1933 | Bende | 339/100 X |
| 2,044,325 | 6/1936 | Patock | 174/152 S |
| 2,264,816 | 12/1941 | Treanor | 174/152 R |
| 3,210,720 | 10/1965 | Harris, Jr. | 339/206 P |
| 3,352,989 | 11/1967 | Leonardis | 174/18 X |
| 3,622,946 | 11/1971 | Rogers | 339/126 RS |
| 3,790,698 | 2/1974 | Engert | 174/152 R |
| 3,801,727 | 4/1974 | Wilkinson et al. | 174/18 X |
| 3,803,523 | 4/1974 | Farmer et al. | 174/152 R X |
| 3,909,509 | 9/1975 | Fisher | 174/152 R |
| 4,223,585 | 9/1980 | Barth et al. | 411/389 |
| 4,437,427 | 3/1984 | Mampaeij | 411/5 X |

FOREIGN PATENT DOCUMENTS

| | | | |
|---|---|---|---|
| 534953 | 10/1931 | Fed. Rep. of Germany | 313/136 |
| 315182 | 7/1929 | United Kingdom | 411/389 |

*Primary Examiner*—Laramie E. Askin
*Attorney, Agent, or Firm*—Sixbey, Friedman & Leedom

[57] ABSTRACT

An electrical bushing includes a replaceable stud which connects the electrical bushing which is mounted on the housing for an electrial distribution unit to electrical equipment located outside the housing. The replaceable stud includes a first stud shank connectable to a conductor within the body of the electrical bushing and which is stronger than a second stud shank connectable to the electrical equipment located outside the housing. The replaceable stud, if damaged, can be removed from the bushing body without otherwise disturbing the bushing body or any connections between the electrical bushing and equipment positioned inside the housing.

3 Claims, 3 Drawing Figures

ELECTRICAL BUSHING HAVING A REPLACEABLE STUD

TECHNICAL FIELD

The present invention relates, in general, to power distribution equipment, and, more particularly, to insulation terminators used with said equipment.

BACKGROUND ART

Electrical bushings are generally used with electrical distribution equipment, such as a transformer having a transformer housing which may be filled with oil and a transformer coil unit located with the transformer housing. Generally, electrical bushings include a bushing body affixable to a wall of a housing for the electrical distribution equipment, and an electrical conductor secured to the bushing body to be rigidly affixed with the bushing body. One end of the electrical conductor is located inside the housing to be connected by a suitable lead to internal electrical components, such as a transformer coil unit. The other end of the electrical conductor is generally located outside the housing to be disposed for interconnection with an electrical line for electrical equipment located externally of the housing.

Electrical bushings generally are of either a male type or female type, with the female type electrical bushing having a hollow interior portion adapted to receive a male electrical terminal for interconnection to external electrical equipment. Electrical bushings of the female type are often referred to as bushing wells.

Conversely, male electrical bushings are not provided with connector terminals recessed within a well but generally the bushing and terminal project from the wall of a housing.

Electrical bushings used with power distribution equipment of various types such as transformers, switchgear, switches and the like have always been susceptible to damage during handling, shipping, installation and maintainance operations. In order to minimize the likelihood of damage and to provide an economical electrical bushing for transformer applications which reduces the possibility of transformer oil leaking from the transformer housing around the electrical bushing, electrical bushings have been permanently mounted, as by welding, to the transformer wall. Such permanent mounting provides a sealed feedthrough connection for interconnecting the transformer unit to the electrical equipment located outside the transformer housing and also provides a secure mounting for the electrical bushing on the transformer wall.

While permanently mounting electrical bushings has prolonged the life of these bushings, the breakage and damage problem is still a substantial one. Bushing terminal breakage or damage typically occurs in the field during installation of a transformer, or similar power distribution equipment, and normally, damaged bushings cannot be properly replaced in the field. This means that the entire unit must often be returned for repair.

If a damaged electrical bushing is cut from a transformer in the field, access to the interior of the transformer housing must be attained to electrically connect a newly installed bushing. Furthermore, the process used to permanently mount the new electrical bushing on the transformer wall may occasionally not completely seal the transformer housing to the electrical bushing. A leakage problem will thereby be created, and such leakage may not be detected until the final stages of mounting the electrical bushing.

Removably mounted electrical bushings have been developed to facilitate the repair or replacement of damaged bushing components in the field. Such removable bushings are disclosed by U.S. Pat. Nos. 3,790,698 to F. O. Engert; 3,803,523 to D. J. Farmer et al and 3,909,509 to J. L. Fisher. These prior art bushing assemblies may be easily removed from a transformer wall in the field for repair or replacement without requiring that the bushing be cut from the transformer. However, for the repair of a relatively small bushing component, such as a broken terminal stud, the entire bushing must be removed. This often requires new electrical connections to be made with internal transformer components, and if the new bushing is not carefully sealed when it is mounted on the transformer wall, the likelihood of leakage around the bushing will be increased.

Since the terminal stud of an electrical bushing is the small component most likely to be damaged in the field, a need has arisen for a bushing construction wherein the terminal stud may be easily removed and replaced in the field without requiring the removal of the bushing from the housing of a power distribution unit.

BRIEF DESCRIPTION OF THE INVENTION

It is a primary object of the present invention to provide a novel and improved electrical bushing assembly for power distribution equipment for electrically connecting internal electrical components to external electrical assemblies. This electrical bushing assembly incorporates a removable stud type terminal which is electrically connected by an integral bushing conductor structure to internal electrical components when the bushing assembly is mounted in place on the housing for the power distribution equipment.

Another object of the present invention is to provide a novel and improved electrical bushing assembly for a transformer which incorporates a removable stud type electrical terminal. This electrical terminal may be easily removed from the remainder of the bushing assembly in the field and replaced without disturbing the electrical connection or the seal between the transformer and the remainder of the bushing assembly.

A further object of the present invention is to provide an electrical terminal stud for an electrical bushing assembly used on power distribution equipment which is adapted for use with either male or female bushing assemblies. Such electrical terminal stud is adapted to be easily removed and replaced without requiring the removal of the bushing assembly from the power distribution equipment of the making or breaking of electrical connections between the bushing assembly and power distribution equipment.

A still further object of the present invention is to provide an electrical terminal stud for a transformer electrical bushing assembly which may be easily removed and replaced. The terminal stud includes two colinear shank sections separated by a flange unit which includes a structure adapted to be engaged buy a stud removal tool. One shank section is formed to have greater strength than the remaining shank section so that the weaker shank section will always be the first to break when the stud is subjected to stress.

Yet another object of the present invention is to provide a novel replaceable terminal stud for use as part of a transformer electrical bushing, with the replaceable stud including two stud shanks which are in colinear relationship. One stud shank is formed to a larger diameter than the other stud shank so that the smaller stud shank will be the first to break under stress. The larger stud shank has screw threads thereon which mate with threads formed in the electrical conductor of the electrical bushing to facilitate easy stud replacement on and removal from the electrical bushing.

These and other objects are accomplished by an electrical bushing embodying the present invention which is used with a transformer or other power distribution equipment and which can be permanently or releasably mounted on the wall of a housing for the equipment.

The electrical bushing includes a bushing body having an electrical conductor rigidly secured therein with a first end located inside the power distribution equipment housing and a second end located outside the power distribution equipment housing when the electrical bushing is mounted on the housing. A replaceable stud is removably engaged with the electrical bushing body and serves to associate the electrical bushing with electrical equipment located outside the housing. This replaceable stud includes a first stud shank which engages the electrical bushing body and the electrical conductor to make electrical contact with the electrical conductor, and a second stud shank which is used to connect the replaceable stud with external electrical equipment. The two stud shanks are colinear, and a flange is affixed to the two stud shanks at the juncture therebetween. The first stud shank is formed to be of greater strength than the second stud shank. This may be accomplished by forming the first stud shank with a diameter larger than that of the second stud shank so that the second stud shank will break first under stress. The flange includes tool engaging means for engaging a tool used to attach and detach the replaceable stud.

BEST MODE FOR CARRYING OUT THE INVENTION

Figure 1:
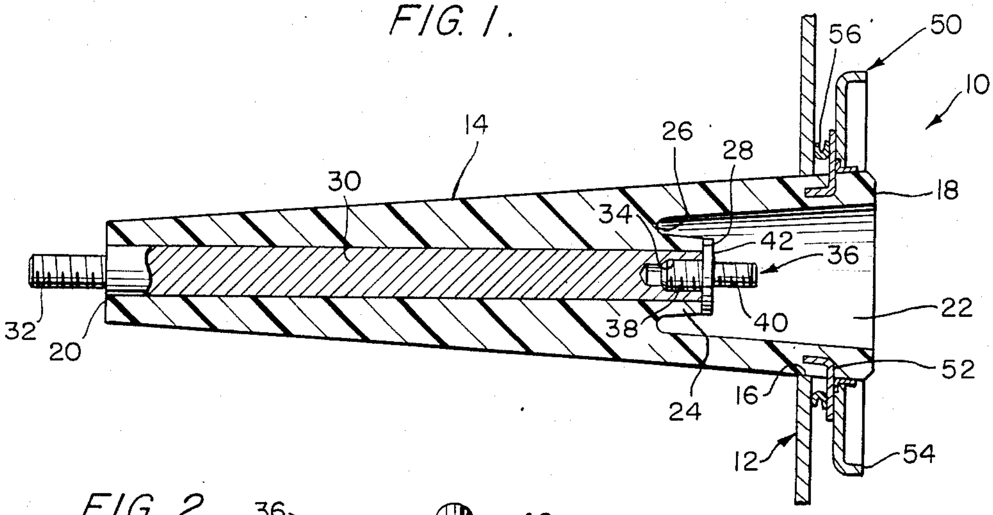
FIG. 1 is a sectional view of an electrical bushing embodying the present invention.

Referring to FIG. 1, an electrical bushing 10 of the present invention is shown in position on the wall 12 of the housing for a power distribution unit, such as a transformer (not shown).

The electrical bushing includes a unitary, one-piece bushing body 14, which can be formed of a suitable synthetic resin or other electrical insulating material and which extends through a bushing receiving opening 16 defined in the transformer wall 12. This bushing body is elongate and extends from an outer end 18 located outside transformer wall 12 to a body inner end 20 located inside the transformer wall. The electrical bushing 10 is of the female type having an interior cavity 22 defined therein which is adapted to receive a male electrical terminal for connecting the electrical bushing 10 with exteriorly located electrical equipment. The cavity 22 opens outwardly from the outer end of the bushing body 14, and the bushing body is formed to provide a boss 24 within the cavity 22. The boss 24 is located to project into the interior cavity 22 from a cavity end wall 26, and this boss terminates within the cavity at a terminal wall 28. An electrical conductor 30 is located within the bushing body and extends from a position adjacent the terminal wall 28 of the boss 24 through the boss and the remainder of the bushing body to the body inner end 20. This electrical conductor is rigidly affixed, as by bonding, to the bushing body, and has a connection means, such as threaded stud 32, which projects from inner end 20 and is adapted to be connected to a transformer coil unit located inside the transformer housing wall 12.

A threaded blind ended bore 34 is defined in the electrical conductor 30 to extend inwardly from the terminal wall 28 of the boss 24. This bore may be threaded to receive a replaceable stud 36 which is removably mounted in electrical contact with the electrical conductor.

Figure 2:
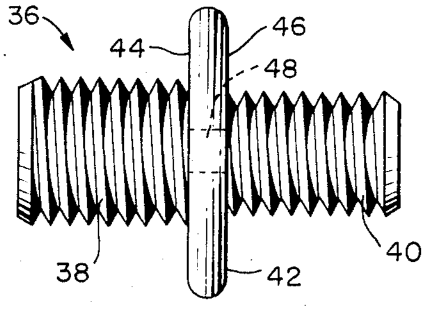
FIG. 2 is a view in side elevation of a replaceable stud used in the electrical bushing of FIG. 1.

The replaceable stud 36 is best shown in FIG. 2, and includes a first threaded shank 38 having a diameter and a thread pitch sized to engage threaded bore 34 to securely yet removably couple the replaceable stud to the electrical conductor 30. Replaceably stud 36 further includes a second threaded shank 40 which operates as an electrical terminal to connect the bushing 10 to external equipment. The second threaded shank extends substantailly colinearly with the first threaded shank 38, and is designed to provide a unitary electrical circuit from the second shank through the first shank to the conductor 30.

The replaceable stud second shank 40 is designed to break under stress before the first shank 38. This may be accomplished by forming the second shank with a diameter smaller than the diameter of the first shank. This may also be accomplished by forming the second shank of conductive material which is weaker than the conductive material forming the first shank or by otherwise mechanically weakening the second shank. Thus, when the replaceable stud 36 is part of electrical bushing 10, damaging stress applied to the replaceable stud will break the second shank, thereby leaving first stud shank undamaged for proper engagement and disengagement with the threaded bore 34.

Replaceable stud 36 further includes a flange 42 formed at the juncture between first and second stud shanks 38 and 40. This flange includes a first surface 44 oriented to engage the terminal wall 28 of the boss 24 to properly seat the replaceable stud. The flange further includes a second surface 46 for engaging connecting means applied to the second shank 40.

The flange 42 is provided with removal tool engaging means, such as a plurality of apertures 48 (only one of which is shown), for engaging a suitable removal tool to permit disengagement of the replaceable stud 36 from the electrical conductor threaded bore 34. Thus, the replaceable stud can be removed from the electrical bushing 10 without disturbing the placement or mounting of the electrical bushing body 14 on the transformer housing wall 12 and without requiring that the conductor 30 be electrically disconnected from any lead within the transformer housing. The apertures 48 in the flange 42 extend through the flange between the first and second surfaces thereof, and receive the prongs of a pronged removal tool. The flange may be configured in other ways to cooperate with removal tools of other types.

Since the second shank 40 forms the electrical terminal which is subjected to external stress, it is important that this shank break before the first shank. Then the replaceable stud 36 can be removed and replaced by a new replaceable stud without otherwise disturbing the electrical bushing body 14 and the mounting thereof on the transformer wall 12, or the connection of the electrical conductor 30 to the transformer coil unit. Seals between the electrical bushing body and the transformer wall 12 remain undisturbed and thus secure.

The bushing body 14 is shown in FIG. 1 as being mounted on the transformer wall 12 by means of a mounting assembly 50 which includes a flange 52 affixed to the bushing body 14. A clamping ring 54, is slipped over the outer end 18 of the bushing body to engage the flange 52, and is then suitable secured to the housing wall 12 by fasteners (not shown). A seal or gasket 56 is compressed between the flange 52 and transformer wall 12.

The mounting assembly 50 is shown as releasably mounting the electrical bushing 10 to the transformer wall 12 in FIG. 1, but the electrical bushing can be permanently secured to the housing by welding, or the like.

Figure 3:
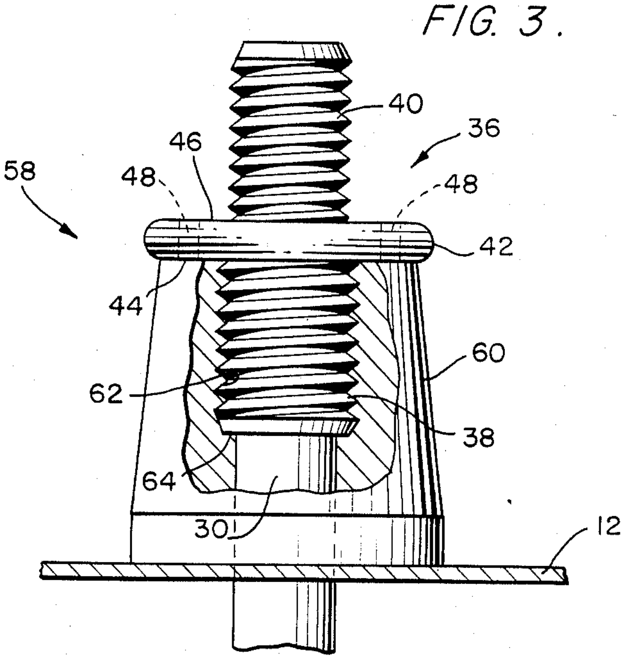
FIG. 3 is a partially cutaway view of a second embodiment of the electrical bushing of the present invention.

The replaceable stud 36 may be effectively used with male as well as female electrical bushings as will be noted from FIG. 3. Here a male electrical bushing indicated generally at 58 includes a bushing body 60 of electrical insulating material which projects from the housing wall 12 of a transformer. A conductor 30 secured within the bushing body extends through the housing wall and is electrically connected to electrical transformer components within the transformer housing. The bushing body is provided with an outwardly opening threaded bore 62 which receives the first shank 38 of the replaceable stud 36. The innermost end of the bore 62 is closed by a bore end wall 64 through which the conductor 30 projects to make electrical contact with the first shank 38 when the first shank is in place within the threaded bore. Thus, in the male electrical bushing 58, the threaded bore 62 supports the replaceable stud 36 and no bore is formed in the conductor 30.

INDUSTRIAL APPLICABILITY

The electrical bushing of the present invention may be effectively mounted upon a transformer housing to provide an electrical transformer terminal for connection to external electrical components. The bushing is adapted to receive a novel replaceable stud 36 which completes an electrical circuit to a conductor mounted within the bushing body. The bushing may be of either the male or female type, and may include a threaded bore in either the bushing body or in the electrical conductor mounted therein to receive a first threaded shank of the replaceable stud. A second shank of the replaceable stud forms the external terminal for the transformer and is formed to be weaker than the first threaded shank. The replaceable stud includes a flange positioned between the first and second shanks which is provided with a configuration to facilitate the use of a removal tool to remove the replaceable stud from the remainder of the electrical bushing. Thus, when the second shank is broken or damaged, the remainder of the replaceable stud may be removed and easily replaced with a new replaceable stud without disturbing the electrical bushing or any of the internal electrical connections to the bushing.

What is claimed is:

1. An electrical bushing for use with a transformer having a transformer housing with an outer wall and electrical components mounted within the transformer housing comprising:

a bushing body formed of electrical insulating material adapted to be mounted on the transformer housing to extend through the outer wall thereof, said bushing body including first and second body terminal ends wherein said first body terminal end is adapted to be inserted through the transformer outer wall and said second body terminal end is adapted to extend outside of said transformer outer wall, a cavity formed in one end of said bushing body to open outwardly of said transformer outer wall at said second body terminal end and a boss extending into and enclosed by said cavity and spaced within said cavity so as to be surrounded by an annular air gap, said boss having an upper wall, electrical conductor means mounted within said bushing body and having an upper end which is adjacent to and which extends from the upper wall of said boss therethrough to said first body terminal end for connection with said electrical components, said electrical conductor means including an open ended threaded bore which communicates with said boss, and replaceable stud means removably mounted on said boss in contact with said electrical conductor means to complete an electrical connection therewith, said replaceable stud means having a first elongated shank and a second elongated shank which are colinear and separated by an annular flange formed in one piece with said first and second elongated shanks which engages said upper wall of said boss and said upper end of said conductor means to properly seat said replaceable stud means, said annular flange including a removal tool engaging means formed thereon to facilitate disengagement of the replaceable stud means from said boss, said first elongated shank being formed with a diameter which is greater than that of said second elongated shank and being received by said boss to contact said electrical conductor means, the first elongated shank being formed of electrically conductive material to complete an electrical connection from said electrical conductor means to said second elongated shank and provided with external threads which engage the threaded open ended bore of said conductor means, and said second elongated shank being formed of electrically conductive material to provide an external terminal for said transformer which terminates within the confines of the cavity in said bushing body with said replaceable stud means mounted on said boss with said first elongated shank in contact with said conductor means, said second elongated shank being formed to be weaker than said first elongated shank so as to break under stress before said first elongated shank, the second elongated shank being formed to be weaker around the section of said second elongated shank which is in contact with the upper surface of the flange.

2. An electrical bushing for use with a transformer having a transformer housing with an outer wall and electrical components mounted within the transformer housing comprising:

a bushing body formed of electrical insulating material adapted to be mounted on the transformer housing to extend through the outer wall thereof, said bushing body including first and second body terminal ends wherein said first body terminal end is adapted to be inserted through the transformer outer wall and said second body terminal end is adapted to extend outside of said transformer outer wall, said bushing body having a greater cross sectional area at said second terminal end thereof and tapering from said second to said first terminal end, a cavity formed in one end of said bushing body to open outwardly of said transformer outer wall at said second body terminal end and a boss extending into and enclosed by said cavity and spaced within said cavity so as to be surrounded by an annular air gap, said boss having an upper wall, and said cavity being of greater cross sectional area adjacent to the second terminal end of said body and tapering inwardly from said second terminal end toward said boss, electrical conductor means mounted within said bushing body and having an upper end which is adjacent to and which extends from the upper wall of said boss therethrough to said first body terminal end for connection with said electrical components, said electrical conductor means including an open ended threaded bore which communicates with said boss, and replaceable stud means removably mounted on said boss in contact with said electrical conductor means to complete an electrical connection therewith, said replaceable stud means having a first elongated shank and a second elongated shank which are colinear and separated by an annular flange formed in one piece with said first and second elongated shanks which engages said upper wall of said boss and said upper end of said conductor means to properly seat said replaceable stud means, said annular flange being formed to conform substantially to the cross sectional configuration of said boss and including a removal tool engaging means formed thereon to facilitate disengagement of the replaceable stud means from said boss, said removal tool engaging means including at least one tool engaging aperture formed in said flange, said first elongated shank being formed with a diameter which is greater than that of said second elongated shank and being received by said boss to contact said electrical conductor means, the first elongated shank being formed of electrically conductive material to complete an electrical connection from said electrical conductor means to said second elongated shank and provided with external threads which engage the threaded open ended bore of said conductor means, and said second elongated shank extending from an upper surface of said flange and being externally threaded and formed of electrically conductive material to provide an external terminal for said transformer which terminates within the confines of the cavity in said bushing body with said replaceable stud means mounted on said boss with said first elongated shank in contact with said conductor means, said second elongated shank being formed to be weaker that said first elongated shank so as to break under stress before said first elongated shank, the second elongated shank being formed to be weaker around the section of said second elongated shank which is in contact with the upper surface of the flange.

3. The electrical bushing of claim 2 wherein mounting assembly means are provided to mount said bushing body to said outer wall, said mounting assembly means including a mounting flange secured to said bushing body and extending outwardly therefrom adjacent to but spaced inwardly from said second body terminal end, a clamping means adapted to be slipped over said second body terminal end to engage said mounting flange, and seal means adapted to fit over said bushing body and to engage and be compressed between said mounting flange and said housing outer wall when said bushing body is mounted upon said outer wall.

* * * * *